UNITED STATES PATENT OFFICE.

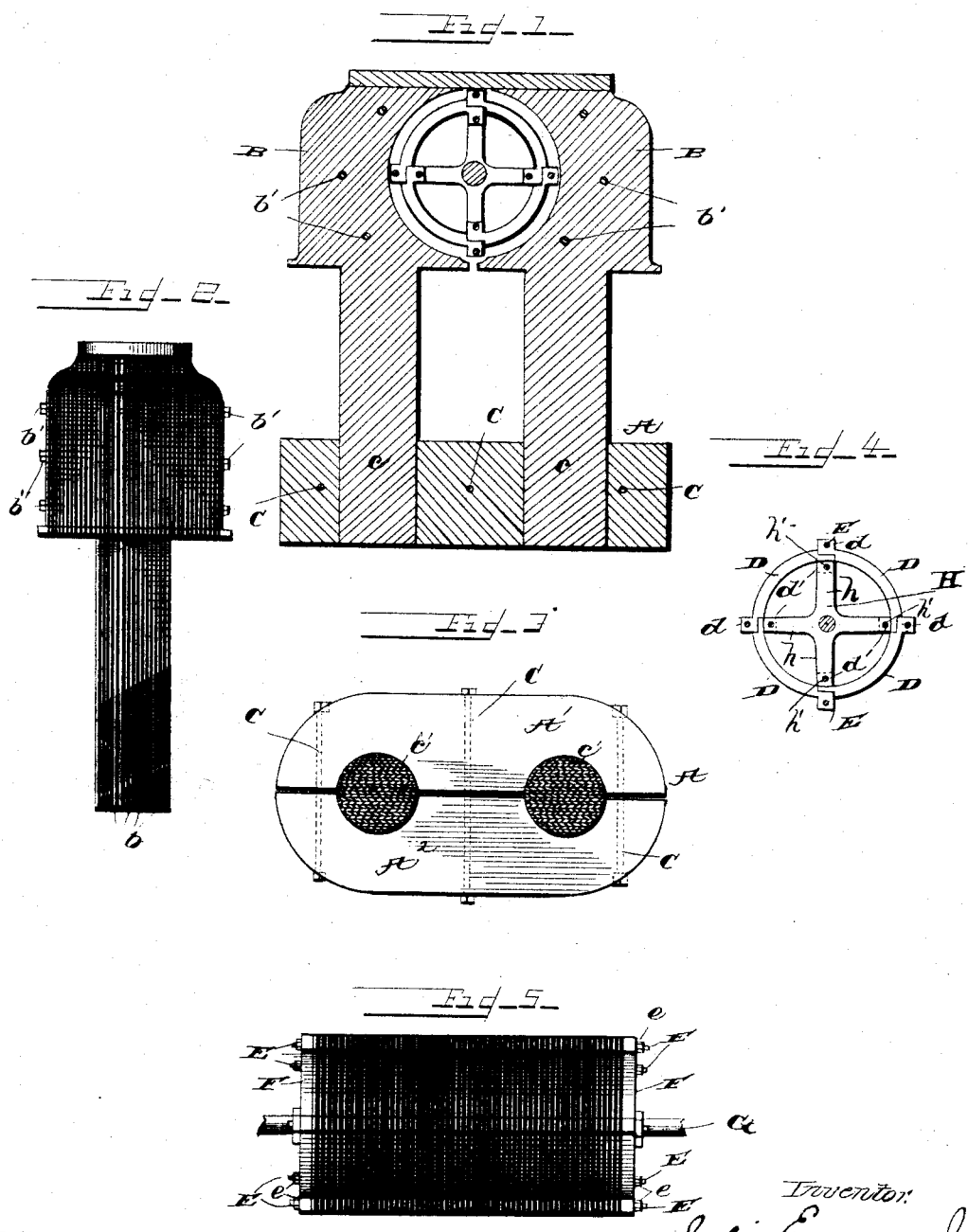

JULIUS EMMNER, JR., OF WASHINGTON, DISTRICT OF COLUMBIA.

ELECTRIC MOTOR.

SPECIFICATION forming part of Letters Patent No. 437,832, dated October 7, 1890.

Application filed August 13, 1889. Renewed September 11, 1890. Serial No. 364,678. (No model.)

*To all whom it may concern:*

Be it known that I, JULIUS EMMNER, Jr., a citizen of the United States, residing at Washington city, in the District of Columbia, have invented certain new and useful Improvements in Electric Motors; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to electric motors; and the object is to produce a motor of this class that will be comparatively inexpensive and develop the greatest power with a given current, and at the same time so constructed that should any of the parts become damaged that part can be replaced without reorganizing the whole machine; and to these ends the novelty consists in the construction, combination, and arrangement of the parts of the same, as will be hereinafter more fully described, and particularly pointed out in the claim.

In the accompanying drawings the same letters of reference indicate like parts of the machine.

Figure 1 is a transverse sectional elevation of the field-magnet and armature of my improved motor. Fig. 2 is a front view of one of the poles of the field-magnet. Fig. 3 is a top plan view of the base or yoke with the poles of the magnets shown in section. Fig. 4 is a side view of a section of the central part of the armature, and Fig. 5 is a view of the armature entire removed from the motor.

As my invention relates principally to the construction of the magnet and armature, to avoid confusion I have illustrated the machine without showing the coils or winding of the armature, as these are too well known to require any description here.

A is the base or yoke and consists of two pieces of iron A' and A².

B B are the poles and are constructed of a series of pieces of sheet or cast iron $b$, which are punched or cast of a suitable shape and secured together by bolts $b'$, forming what may be termed a "compound electro-magnet."

These thin sheets may be magnetically insulated from each other by a thin strip of fiber or any suitable material, or they may be built up together without it, if desired. The ends $c\ c$ of the poles B B are inserted in suitable holes $c'\ c'$ in the base-yoke A and the whole firmly clamped together by the cross-bolts C C.

The armature is a rotary one and consists of a series of sectional annular rings, each ring being divided into four sections, each section being exactly alike and consisting of the quadrant D, having an external lug $d$ and an internal lug $d'$, each lug being provided with a hole, through which passes a bolt E, having nuts $e\ e$ on the outside of the end pieces F F, by means of which the whole can be firmly and rigidly clamped together to form a practically solid armature, which is mounted upon and secured to the shaft G, so that the whole rotates together.

About the center of the armature, or midway between the end pieces F F, is placed a spider H, through which the shaft G passes, and the ends of the arms $h$ of said spider are provided with holes $h'$, through which one of the bolts E passes and which tends to hold the armature as against centrifugal force when rotating very rapidly.

In wrapping the armature a series of the sections are bolted together to form a quadrant or quarter-section, and this section is then wound longitudinally, which can be done very readily owing to its shape, and after all four are thus wound the end pieces are put on, the spider being placed in position in the middle and the whole screwed up firmly by means of the bolts and nuts E $c$. If desirable, the sections of the armature may be magnetically insulated, as above described, for the magnet.

By this construction of the armature it will be seen that should one section be damaged or "burned out" that particular section can be removed and rewound or replaced without interfering with the rest of the armature or interfering with the machine proper.

Having thus described my invention, what I claim as new and useful, and desire to secure by Letters Patent, is—

In an electric motor, the combination of the base or yoke formed of two pieces of iron, the poles bolted between said pieces and formed of a series of pieces of iron bolted together and having segmentally scored-out enlarged heads capped, as shown, and constituting a compound electro-magnet, the rotary armature formed of a series of sectional annular rings, each ring being a quadrant provided with lugs, the said rings bolted together, as described, to form practically a solid armature secured to a shaft, and the middle spider H, all as specified.

In testimony whereof I affix my signature in presence of two witnesses.

JULIUS EMMNER, Jr.

Witnesses:
HENRY J. ENNIS,
J. W. MEEK.

It is hereby certified that Letters Patent No. 437,832, granted October 7, 1890, upon the application of Julius Emmner, jr., of Washington, D. C., for an improvement in "Electric Motors," was erroneously issued to said Emmner as owner of the said invention; that said Letters Patent should have been issued to *Henry J. Ennis, trustee, of same place,* said Ennis being sole owner of the entire interest therein, as trustee, as shown by the record of assignments in this Office; and that said Letters Patent should be read with this correction therein that the same may conform to the record of the case in the Patent Office.

Signed, countersigned, and sealed this 28th day of October, A. D. 1890.

[SEAL.]

CYRUS BUSSEY,
*Assistant Secretary of the Interior.*

Countersigned:
    C. E. MITCHELL,
        *Commissioner of Patents.*